United States Patent

Peter et al.

[11] Patent Number: 5,108,188
[45] Date of Patent: Apr. 28, 1992

[54] METHOD FOR PRODUCING RUBBER MIXTURES

[75] Inventors: Julius Peter, Tiergartenstrasse 107, 3000 Hannover 71; Günter Weckerle, Northeim, both of Fed. Rep. of Germany

[73] Assignees: Continental Aktiengesellschaft; Julius Peter, both of Hanover, Fed. Rep. of Germany

[21] Appl. No.: 661,028

[22] Filed: Feb. 28, 1991

[30] Foreign Application Priority Data

Feb. 28, 1990 [DE] Fed. Rep. of Germany ....... 4006194

[51] Int. Cl.⁵ .......................... B29B 7/04; B29B 13/04
[52] U.S. Cl. .......................................... 366/91; 264/28; 264/349; 264/39; 425/204; 425/205; 425/209; 425/382.3; 425/378.1; 366/149; 523/351
[58] Field of Search .................. 264/349, 28, 39; 523/346, 351; 366/85, 91, 149; 425/204, 205, 209, 382.3, 378.1

[56] References Cited

U.S. PATENT DOCUMENTS

| | | | |
|---|---|---|---|
| 2,351,706 | 6/1944 | Robinson | 366/91 |
| 4,018,860 | 4/1977 | Farrell | 264/39 |
| 4,151,236 | 4/1979 | Ryder | 264/39 |
| 4,161,419 | 7/1979 | Alia | 523/351 |
| 4,876,297 | 10/1989 | Peter | 524/496 |
| 4,910,237 | 3/1990 | Peter | 523/351 |

FOREIGN PATENT DOCUMENTS 57-113047  7/1982  Japan ..................... 366/91

*Primary Examiner*—Jeffery Thurlow
*Assistant Examiner*—Mathieu Vargot
*Attorney, Agent, or Firm*—Robert W. Becker & Associates

[57] ABSTRACT

A method for producing a rubber mixture. In a first stage, in a ram kneader, a master batch is produced, and in a second stage, in a batch-type process, a final mixture is produced in a ram-less kneader, without the need for intermediate storage. To improve the cooling in the ram-less kneader, the interior of this kneader is supplied with air that has such a degree of dryness that a condensation deposit is precluded. To achieve this, an essentially air tight channel is provided between the two kneaders, with a place being provided in the channel for the bottom closure of the ram kneader in a swung-out position of this closure.

1 Claim, 1 Drawing Sheet

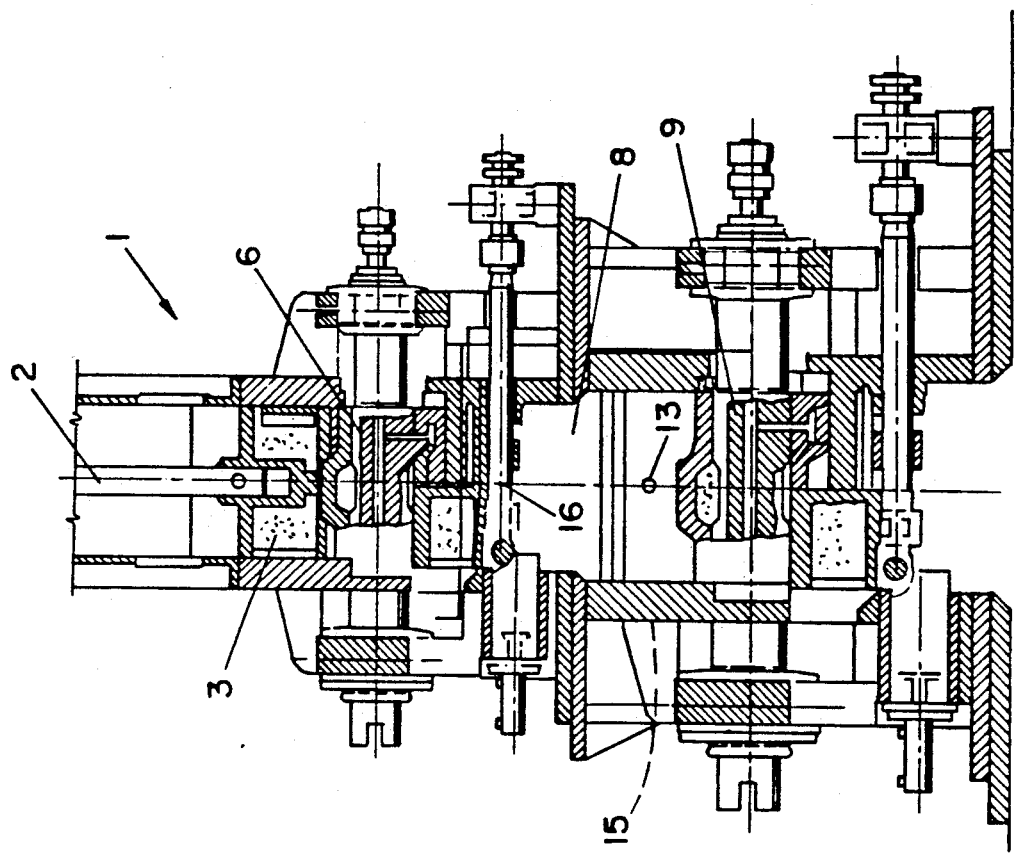
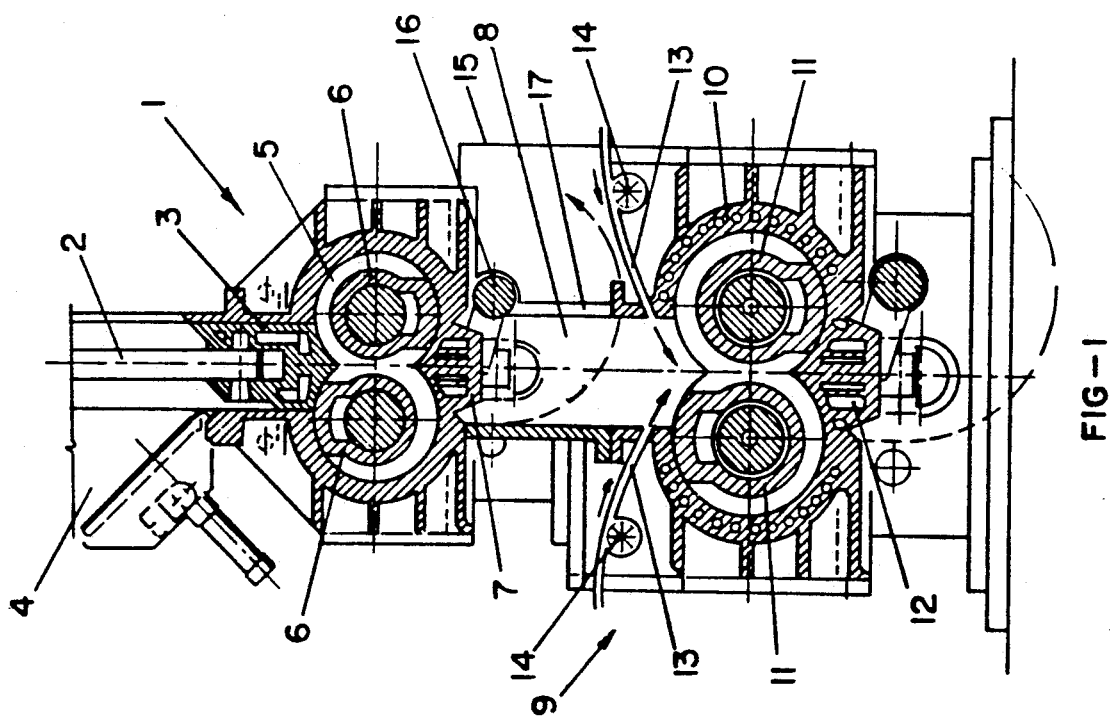

METHOD FOR PRODUCING RUBBER MIXTURES

BACKGROUND OF THE INVENTION

The present invention relates to a method and apparatus for producing a rubber mixture, where in a first stage, in a ram kneader, a master batch that comprises rubber and non-reactive additives is produced in a batch-type process, and in a second stage, again in a batch-type process, without intermediate storage of the master batch, and accompanied by the addition of reactive additives, the master batch is transferred into a ram-less kneader for final mixing and cooling. The present invention also relates to such a method where the maximum temperature during the final mixing is less than the temperature during the master batching.

It is clear that with a method of the aforementioned type, of particular significance is the cooling of the ram-less kneader, and of course once the mechanical conditions have been set, the temperature of the coolant plays a crucial role.

It is therefore an object of the present invention to improve the cooling of the ram-less kneader, without in so doing also having to significantly change the construction of the kneader.

BRIEF DESCRIPTION OF THE DRAWING

This object, and other objects and advantages of the present invention, will appear more clearly from the following specification in conjunction with the accompanying schematic drawing, in which:

FIG. 1 is a vertical cross-sectional view through one exemplary embodiment of the inventive apparatus for carrying out the method of the present invention; and FIG. 2 is a cross-sectional view through the apparatus of FIG. 1, in a side view.

SUMMARY OF THE INVENTION

The method of the present invention is characterized primarily in that the interior of the ram-less kneader is charged with air that has such a degree of dryness that a condensation deposit is at least practically precluded. In particular, under these conditions the temperature of the coolant should be between approximately 0° C. and 10° C., whereby the degree of dryness is then set such that the air must have a dew point that must be below the aforementioned temperature of the coolant.

In so doing, it is possible to preclude the so-called sweating of the metallic parts that come into contact with the rubber, and yet to be able to carry out a relatively good cooling. Furthermore, particularly good results are produced if the dry air is supplied to the interior of the ram-less kneader in such a way that this kneader is under a slight positive pressure.

In addition, it is also possible to utilize the known proposal of making the transfer channel between the master batcher and the ram-less kneader essentially airtight, in order in this manner to carry out the desired supply of air to the ram-less kneader and beyond that to leave the vicinity of the mixture aggregate uninfluenced by the dry air. Finally, it is even possible to utilize a draping that can replace the aforementioned channel. Such a draping, which is made of flexible material, is intended to protect the communication between the outlet of the master batcher and the inlet of the ram-less kneader, and to eliminate undesired air circulation.

All of the aforementioned measures lead to an improvement in the quality of the rubber mixture, the production of which, in the event that a liquid film is present, is at least made more difficult, and under extreme conditions can even be made impossible.

Further specific features of the present invention will be described in detail subsequently.

DESCRIPTION OF PREFERRED EMBODIMENTS

Referring now to the drawing in detail, the ram kneader 1, which is disposed at the top, is provided with a ram 3 that can be raised and lowered via a piston rod 2. To expose the feed opening and permit charging of the ram kneader 1, the ram 3 is moved upwardly. The hopper 4 is charged; in so doing, the master batch, and a measured quantity of additive, pass into the mixing chamber 5. After the charging is completed, the ram 3 is lowered in order to close off the mixing chamber 5. Mixing is effected by rotating the two rotors 6 that are disposed in the mixing chamber 5.

After completion of the master batch, the saddle 7 that closes off the bottom of the mixing chamber 5 is swung downwardly and to the side so that the master batch can be discharged directly and can pass via a vertical channel 8 into the opening of the ram-less, and hence always upwardly open, kneader 9 that is disposed directly below the master batcher or ram kneader 1; the ram-less kneader 9 is provided with a mixing chamber 10 and rotors 11 that are disposed therein. It should be noted that the mixing chamber 10 is larger than the mixing chamber 5. In addition, in contrast to the kneader 1, the ram-less kneader 9 is operated at a lower speed and is furthermore operated in such a way that a cooling of the material that is to be mixed occurs, and at a lower temperature the reactive additives can be added via a non-illustrated opening that can, if desired, be closed off.

After final production of the rubber mixture, the hinged saddle 12 of the ram-less kneader 9 is swung downwardly; the finished mixture can then escape toward the bottom, for example onto a screw conveyor.

Just above the inlet opening for the mixing chamber 10, passages 13 open out into the mixing chamber 10 for the introduction of dried air, which can be supplied via blowers 14.

If, for example, the mixing chamber 10 is cooled with water having a temperature of approximately 5° C., and if a corresponding mixing chamber temperature is established, the dew point of the introduced air must be less than 5° C. so that the formation of dew does not take place within the mixing chamber 10, and the formation of a condensation deposit, which would impair the production of the mixture, is avoided.

So that the saddle 7, which has a horizontal pivot axis 16, can be swung downwardly and to the side, and in particular through the opening indicated by the reference numeral 17, thus opening the ram kneader 1, the opening 17 and the swung-out saddle 7 are covered and protected by a knapsack-like part 15 so that the transfer channel 8 can be at least essentially airtight.

The present invention is, of course, in no way restricted to the specific disclosure of the specification and drawings, but also encompasses any modifications within the scope of the appended claims.

What we claim is:

1. A method of producing a rubber mixture, including the steps of:

in a first stage, in a ram kneader, producing in a batch-type process a master batch that comprises rubber and non-reactive additives;

in a second stage, transferring said master batch, again in a batch-type process, without intermediate storage thereof, and accompanied by the addition of reactive additives, into a ram-less kneader for final mixing and cooling;

charging the interior of said ram-less kneader with dry air that has such a degree of dryness that a condensation deposit within the ram-less kneader is practically precluded, whereby the interior of said ram-less kneader is charged with said dry air in such a way that said interior of said ram-less kneader is under a slight positive pressure;

providing a channel between an outlet of said ram kneader and a mixing chamber of said ram-less kneader, whereby said dry air is introduced into said channel; and operating said ram-less kneader with a coolant having a temperature of about 0° C.–10° C., said dry air having a dew point below the coolant temperature.

* * * * *